United States Patent

Duroux et al.

[11] Patent Number: 6,109,755
[45] Date of Patent: Aug. 29, 2000

[54] RETRACTABLE EXTERIOR MIRROR FOR A MOTOR VEHICLE

[75] Inventors: Bernard Duroux, Garancieres; Daniel Dumont, Veneux les Sablons, both of France

[73] Assignee: Britax Geco S.A., France

[21] Appl. No.: 09/082,871

[22] Filed: May 21, 1998

[30] Foreign Application Priority Data

May 24, 1997 [GB] United Kingdom .................... 9710649

[51] Int. Cl.[7] ...................................... B60R 1/06
[52] U.S. Cl. ......................... 359/841; 359/838; 359/872; 359/877
[58] Field of Search ...................... 359/838, 841, 359/843, 844, 872, 873, 874, 876, 877

[56] References Cited

U.S. PATENT DOCUMENTS

| | | | |
|---|---|---|---|
| 3,820,877 | 6/1974 | Moyer | 359/841 |
| 4,911,545 | 3/1990 | Miller | 359/841 |
| 4,936,670 | 6/1990 | Yoo | 359/841 |
| 5,148,325 | 9/1992 | Wang | 359/841 |
| 5,182,675 | 1/1993 | Arbisi et al. | 359/841 |
| 5,563,741 | 10/1996 | Leonberger | 359/841 |
| 5,745,310 | 4/1998 | Mathieu | 359/843 |
| 5,838,505 | 11/1998 | Palathingal | 359/841 |

FOREIGN PATENT DOCUMENTS

| | | | |
|---|---|---|---|
| 0 798 163 A2 | 10/1997 | European Pat. Off. | B60R 1/06 |
| 3718125C1 | 8/1988 | Germany | 359/877 |
| 0179350 | 9/1885 | Japan | 359/841 |
| 358136537 | 8/1983 | Japan | 359/841 |
| 0114140 | 7/1984 | Japan | 359/841 |
| 0119449 | 6/1986 | Japan | 359/877 |
| 0146654 | 7/1986 | Japan | 359/841 |
| 0150850 | 7/1986 | Japan | 359/841 |
| 0291747 | 11/1988 | Japan | 359/844 |
| 0136939 | 6/1991 | Japan | 359/877 |
| 404133835 | 5/1992 | Japan | 359/844 |
| 405162589 | 6/1993 | Japan | 359/841 |
| 0911251 | 11/1962 | United Kingdom | 359/841 |
| WO 93/24345 | 12/1993 | WIPO | 359/877 |

OTHER PUBLICATIONS

Patent Abstracts of Japan, Publication No. 55145041, dated Dec. 11, 1980, "Side–Check Mirror For Automobile".

*Primary Examiner*—Thong Nguyen
*Assistant Examiner*—John Juba, Jr.
*Attorney, Agent, or Firm*—Thomas F. Quinn, Jr. Esq.; Philip R. Warn, Esq.

[57] ABSTRACT

An exterior mirror for a motor vehicle has a housing received within a recess in a vehicle body. A mirror support is mounted in the housing for angular movement between a deployed position and a stowed position in which the mirror support is contained within the housing.

22 Claims, 4 Drawing Sheets

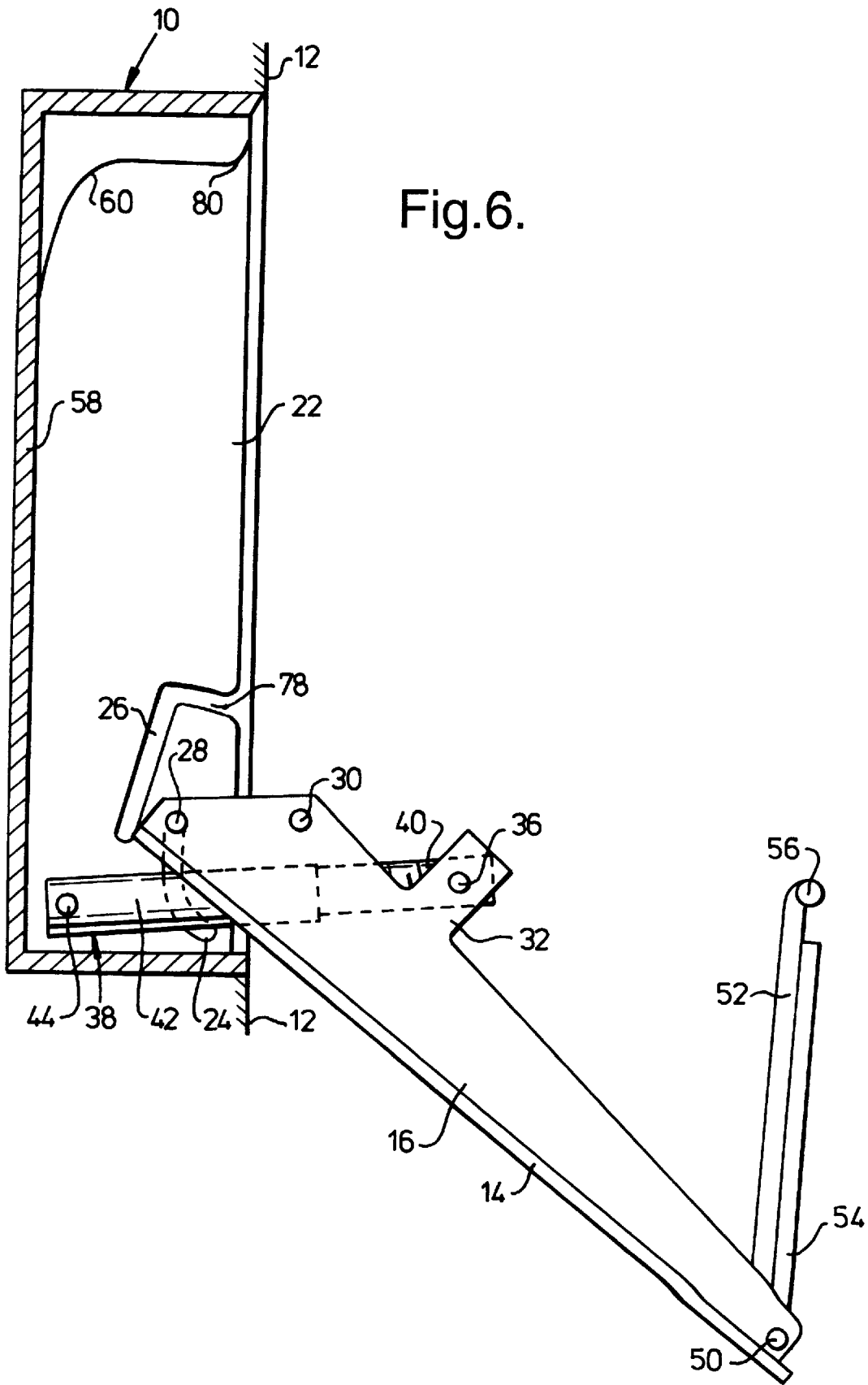

RETRACTABLE EXTERIOR MIRROR FOR A MOTOR VEHICLE

This invention relates to an exterior mirror for a motor vehicle of the type comprising a base member adapted to be secured to a vehicle body, a mirror support mounted on the base member for angular movement between a deployed position and a stowed position in which the distance by which the mirror support projects from the vehicle body is reduced, and a mirror glass mounted on the mirror support.

RELATED ART

An exterior mirror of this type is disclosed in EP-A-0798163.

SUMMARY OF THE INVENTION

According to the invention, in an exterior rear view mirror of the type described above, the base member comprises a housing adapted to be received within a recess in the vehicle body, the mirror support being at least partially contained within the housing when in its stowed position.

Preferably, when the mirror carrier is in its stowed position, an outer surface thereof has its edge regions substantially coplanar with adjacent regions of the vehicle body.

In one form of the invention, the mirror carrier is movable between a first, partially deployed position giving a first, relatively restricted, angular field of view suitable for use on high speed roads, and a second fully deployed position giving a greater angular field of view suitable for use on urban roads. When in its partially deployed position, the mirror carrier does not project as far from the vehicle body as when in its fully deployed position, with the result that the drag due to wind resistance is reduced.

BRIEF DESCRIPTION OF THE DRAWINGS

FIG. 6 is a cross-sectional view, similar to FIGS. 1, 4 and 5, but showing the mirror in a displaced position after impact from the rear.

DETAILED DESCRIPTION OF THE PREFERRED EMBODIMENT

Figure 1:
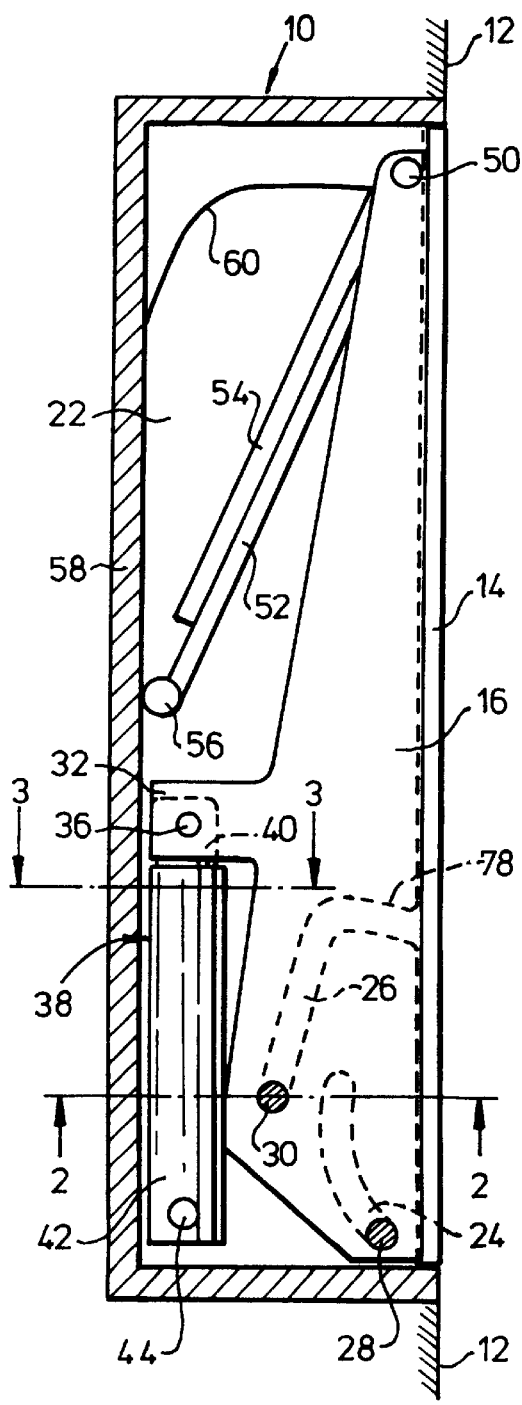
FIG. 1 is a horizontal cross-sectional view of an exterior mirror in accordance with the invention.
Figure 2:
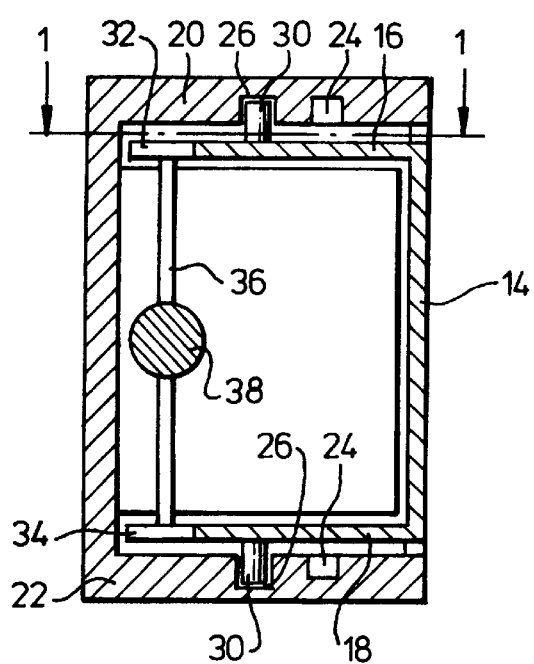
FIG. 2 is a cross-sectional view taken on the line 2—2 of FIG. 1 and showing the section line 1—1 of FIG. 1.

Referring to FIGS. 1 and 2, the base for a vehicle mirror in accordance with the invention comprises a hollow rectangular housing 10 which is recessed within a vehicle body panel 12 and has an opening facing outwardly. In FIGS. 1 and 2, the opening in the housing 10 is covered by a hood 14 which is of U-shaped cross section, having two side limbs 16 and 18 which project into the housing parallel and closely adjacent to the upper and lower walls 20 and 22 thereof, respectively.

Each side wall 20 and 22 has a pair of guide grooves 24, 26 formed therein. Each of the guide grooves 24 is engaged by a respective guide peg 28 on the side limbs 16 and 18 of the hood 14. Similarly, each of the guide grooves 26 is engaged by a corresponding guide peg 30. The shape of the guide grooves 24 and 26 is chosen in accordance with the desired trajectory of the hood 14, as will be described hereinafter.

Each of the side limbs 16 and 18 has a respective inwardly extending projection 32, 34 having an axle 36 mounted therebetween. A screw jack unit 38 has the projecting end of its jacking screw 40 pivotally mounted on the axle 36. The other end of the body 42 of the screw jack unit 38 is mounted on a pivot axle 44 extending between the upper and lower walls 20 and 22 of the housing 10.

A pivot axle 50 extends between the side limbs 16 and 18 at the opposite end to the slots 24. A mirror carrier 52, carries a mirror glass 54 on one side. One end of the mirror carrier 52 is pivotally mounted on the axle 50 and its other end carries a cam follower 56. A spring (not shown) biasses the mirror carrier 52 in the clockwise direction (as viewed in FIG. 1) about the axle 50 so as to urge the cam follower 56 into abutment with the inside wall 58 of the housing 10. A cam surface 60 is provided within the housing 10 for engagement by the cam follower 56 when the mirror glass 54 is deployed, as will be explained hereinafter.

Figure 3:
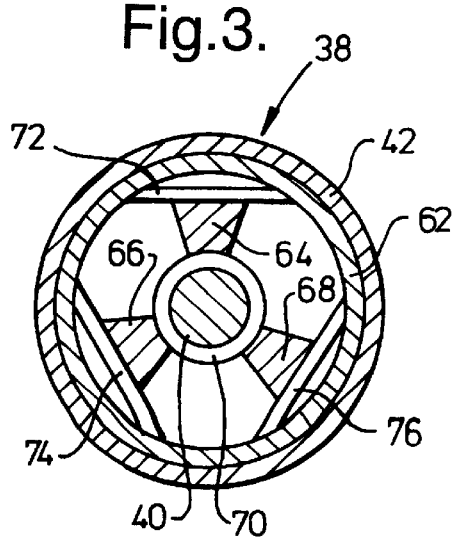
FIG. 3 is a fragmentary cross-sectional view taken on the line 3—3 in FIG. 1 and showing part of the adjustment mechanism on an enlarged scale.
Figure 4:
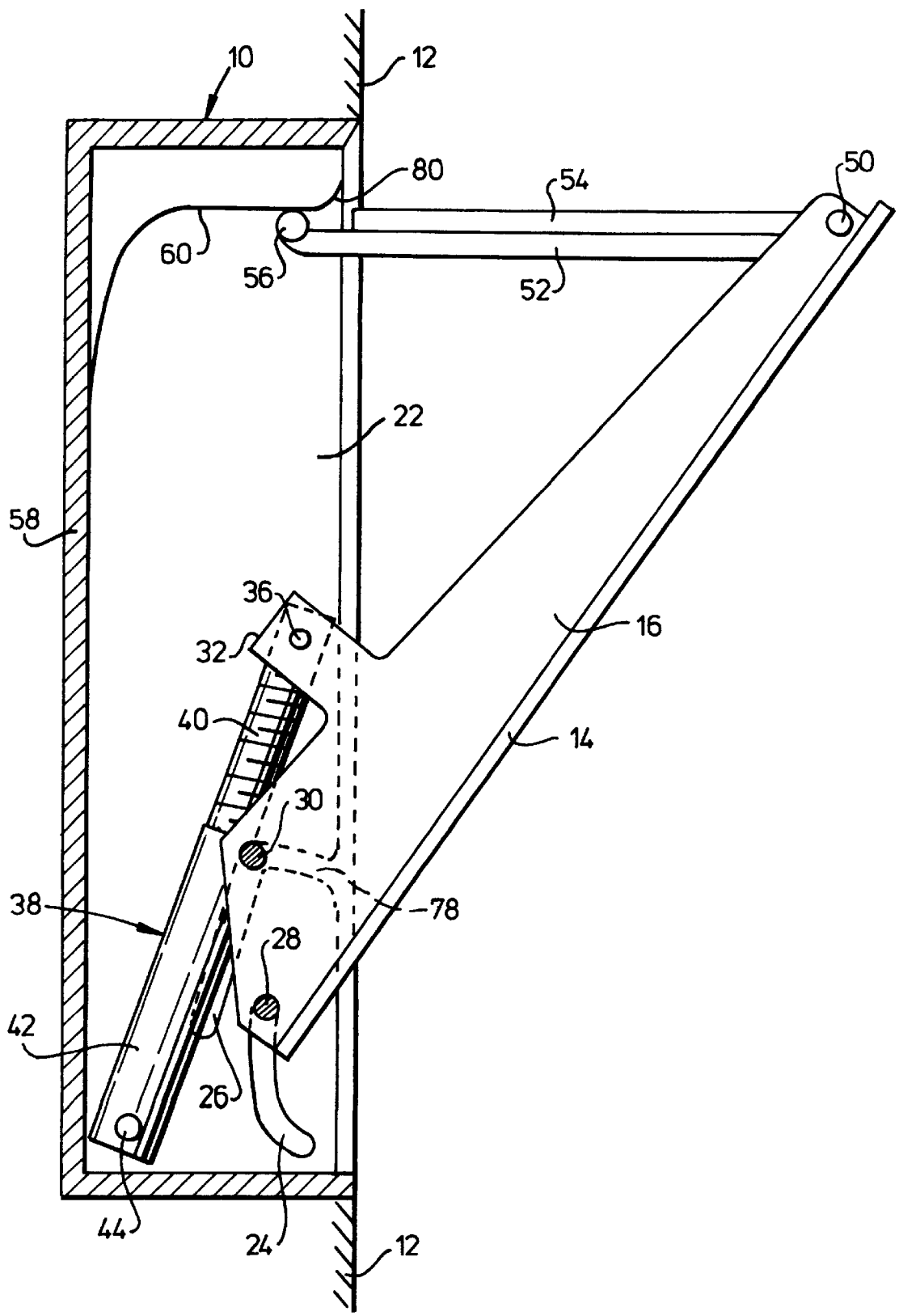
FIG. 4 is a cross-sectional view, similar to FIG. 3 but showing the mirror carrier in its fully deployed position, suitable for use on urban roads.

Referring to FIG. 3, the body 42 of the screw jack unit 38 contains a nut 62 having three threaded segments 64, 66 and 68, each of which is biased into engagement with the screw thread 70 on the jacking screw 40 by a respective leaf spring 72, 74, 76. An electric motor (not shown) is arranged to cause rotation of the nut 62 relative to the body 42 so that the jacking screw 40 is protracted or retracted (dependent on the direction of rotation). Should an excessive load be imposed on the jacking screw 40, the spring loaded segments 64, 66 and 68 of the nut 62 ride over the screw thread formation 70 on the jacking screw, allowing displacement thereof relative to the screw jack body 42.

Referring to FIG. 2, switching on the ignition of the motor vehicle causes the electric motor to drive the jacking screw 40 outwardly until the pegs 28 abut against the opposite ends of their respective slots 24 to that shown in FIG. 1. The hood 14 pivots outwardly and the cam follower 56 travels along the cam surface 60 so that the mirror carrier 52 extends substantially perpendicular to the vehicle body 12 and substantially the whole of the mirror glass 54 is outside the line of the vehicle body. This is the position giving the widest angle of view, suitable for urban driving.

Figure 5:
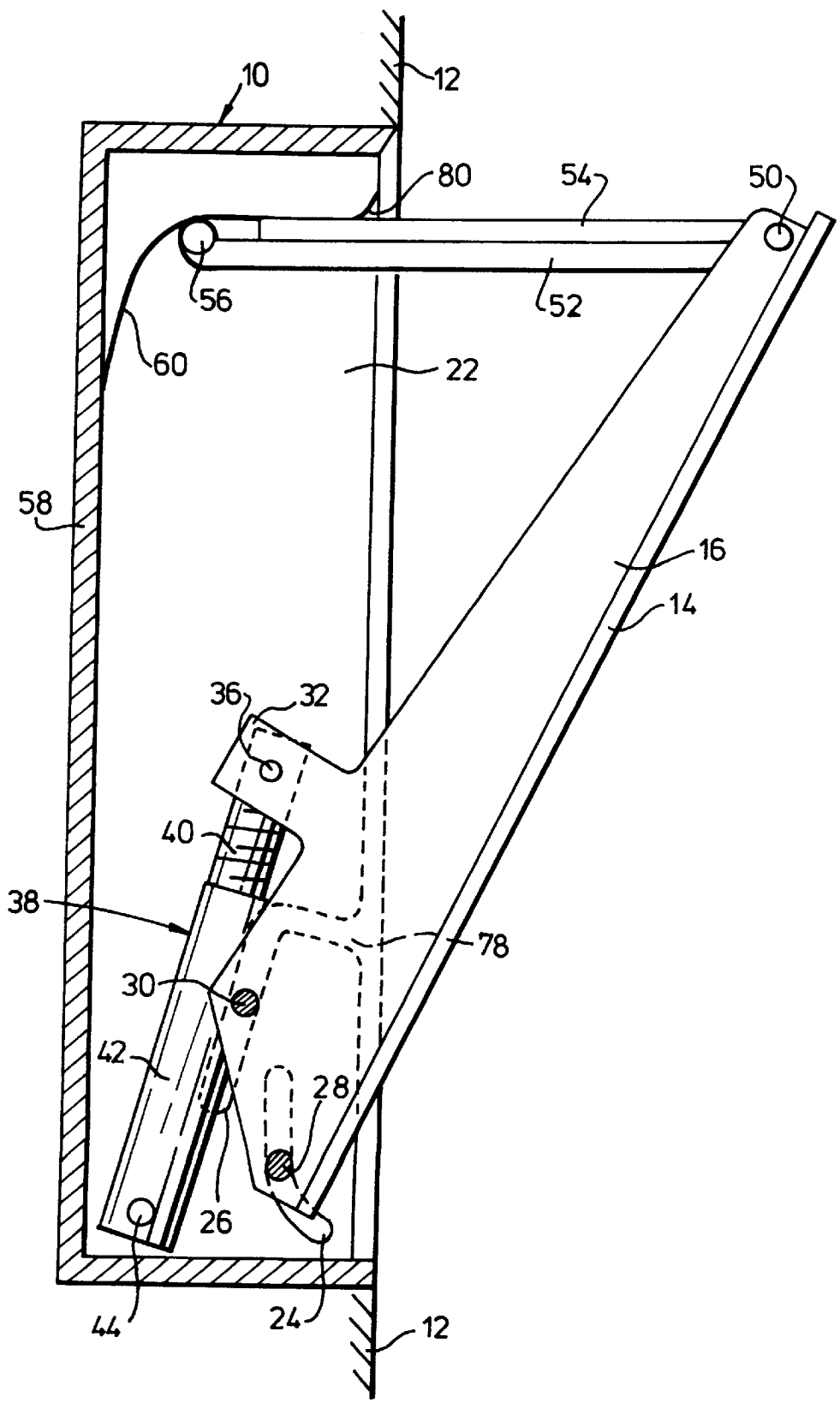
FIG. 5 is a cross-sectional view, similar to FIGS. 1 and 4, but showing the mirror in its partially deployed position, suitable for use on high speed roads.

When the vehicle is travelling on a motorway or other high speed road, it is desirable to reduce wind resistance as much as possible. Except when overtaking, a more restricted field of view is acceptable than is required on urban roads. Accordingly, the jacking screw is retracted to pull the mirror glass inwardly to the position shown in FIG. 5 at which an electrical sensor sensing either the position of the jacking screw 40 relative to the screw jack body 42 or the position of the cam follower 56 on the cam surface 60 operates to disconnect the electric motor of the screw jack drive 42 from its power supply. Since the cam follower 56 is travelling along the straight part of the cam surface 60 during this movement, the angle between the mirror glass 54 and the vehicle body does not change. Consequently, the precise position at which the screw jack drive 42 stops is not critical.

If the hood 14 is subject to impact, it can be displaced either forwardly or rearwardly, the jacking screw 40 riding over the spring loaded segments 64, 66 and 68 of the jacking nut 62. If the impact is from the front, the consequence is to displace the hood 14 towards its fully stowed position, from which it can be restored using the electric motor drive in the same manner as when the mirror is initially deployed.

Each slot 26 has a side branch 78 leading to the outer edge of the upper and lower walls 20 and 22. In the event of impact from the rear, the peg 30 is displaced out of the slot 26 as illustrated in FIG. 6. The hood 14 must be restored manually or mechanically at least to a position in which the line of action of the screw jack unit 38 (between the axles 36 and 44) is to the left of the pegs 28 (as viewed in FIGS. 1 and 4–6). A stop on the hood 14 limits clockwise angular movement of the mirror carrier 52 to enable a ramp portion 80 at the outer end of the cam surface 60 to guide the cam follower 56 back into abutment therewith.

What is claimed is:

1. An exterior mirror for a motor vehicle comprising:

a housing adapted to be received within a recess in a vehicle body, a mirror support mounted in the housing for angular movement between a deployed position and a stowed position in which the distance by which the mirror support projects from the vehicle body is reduced, and a mirror glass mounted on the mirror support, wherein the mirror support is at least partially contained within the housing when in its stowed position, an outer surface of the mirror support has its edge regions substantially coplanar with adjacent regions of the vehicle body when the mirror support is in its stowed position, the housing includes a recess for receiving the mirror glass when in its stowed position, the outer surface of the mirror support comprises a hood which has its front end coupled to the housing by pivot means so as to cover the recess when the mirror support is in its stowed position, and the mirror support further comprises a mirror carrier on which the mirror glass is mounted, the mirror carrier having a first end coupled to a rear end of the hood and a cam follower on its second end engaging with a cam surface within the recess.

2. An exterior mirror according to claim 1, wherein the housing has a pair of mutually parallel side walls and the pivot means comprises a first pair of guide pegs engaging in respective first guide grooves in the side walls and a second pair of guide pegs engaging in respective second guide grooves in the side walls, the first guide pegs being at a first end of the first guide grooves and the second guide pegs being at a first end of the second guide grooves when the mirror support is in its stowed position.

3. An exterior mirror according to claim 2, wherein each second guide groove has a portion of arcuate shape centred on the second end of the corresponding first guide groove.

4. An exterior mirror according to claim 3, wherein said portion of arcuate shape extends to the outer edge of the corresponding side wall.

5. An exterior mirror according to claim 1, wherein the mirror support is movable between a first, partially deployed position giving a first, relatively restricted, angular field of view, and a second fully deployed position giving a greater angular field of view, the mirror support projecting further from the vehicle body when in its second deployed position than when in its first deployed position.

6. An exterior mirror for a motor vehicle comprising:

a housing adapted to be received within a recess in a vehicle body, a mirror support mounted in the housing for angular movement between a deployed position and a stowed position in which the distance by which the mirror support projects from the vehicle body is reduced, and a mirror glass mounted on the mirror support, wherein the mirror support is at least partially contained within the housing when in its stowed position, an outer surface of the mirror support has its edge regions substantially coplanar with adjacent regions of the vehicle body when the mirror support is in its stowed position, the housing includes a recess for receiving the mirror glass when in its stowed position, the outer surface of the mirror support comprises a hood which has its front end coupled to the housing by pivot means so as to cover the recess when the mirror support is in its stowed position, and the housing has a pair of mutually parallel side walls and the pivot means comprises a first pair of guide pegs engaging in respective first guide grooves in the side walls and a second pair of guide pegs engaging in respective second guide grooves in the side walls, the first guide pegs being at a first end of the first guide grooves and the second guide pegs being at a first end of the second guide grooves when the mirror support is in its stowed position.

7. An exterior mirror according to claim 6, wherein each second guide groove has a portion of arcuate shape centred on the second end of the corresponding first guide groove.

8. An exterior mirror according to claim 7, wherein said portion of arcuate shape extends to the outer edge of the corresponding side wall.

9. An exterior mirror according to claim 7, wherein a screw jack drive has one coupled by a first pivot pin to the hood and its other end coupled by a second pivot pin to the housing.

10. An exterior mirror according to claim 7, wherein the mirror support is movable between a first, partially deployed position giving a first, relatively restricted, angular field of view, and a second fully deployed position giving a greater angular field of view, the mirror support projecting further from the vehicle body when in its second deployed position than when in its first deployed position.

11. An exterior mirror according to claim 6, wherein a screw jack drive has one coupled by a first pivot pin to the hood and its other end coupled by a second pivot pin to the housing.

12. An exterior mirror according to claim 6, wherein the mirror support is movable between a first, partially deployed position giving a first, relatively restricted, angular field of view, and a second fully deployed position giving a greater angular field of view, the mirror support projecting further from the vehicle body when in its second deployed position than when in its first deployed position.

13. An exterior mirror for a motor vehicle comprising:

a housing adapted to be received within a recess in a vehicle body, a mirror support mounted in the housing for angular movement between a deployed position and a stowed position in which the distance by which the mirror support projects from the vehicle body is reduced, and a mirror glass mounted on the mirror support, wherein the mirror support is at least partially contained within the housing when in its stowed position, an outer surface of the mirror support has its edge regions substantially coplanar with adjacent regions of the vehicle body when the mirror support is in its stowed position, the housing includes a recess for receiving the mirror glass when in its stowed position, the outer surface of the mirror support comprises a hood which has its front end coupled to the housing by pivot means so as to cover the recess when the mirror support is in its stowed position, and a screw jack drive has one end coupled by a first pivot pin to the hood and its other end coupled by a second pivot pin to the housing.

14. An exterior mirror for a motor vehicle comprising:

a housing adapted to be received within a recess in a vehicle body, a mirror support mounted in the housing for angular movement between a deployed position and a stowed position in which it is at least partially contained within the housing so that the distance by which said mirror support projects from the vehicle body is reduced, and a mirror glass mounted on the mirror support, wherein the mirror support comprises a mirror carrier on which the mirror glass is mounted, the mirror carrier having a cam follower engaging with a cam surface within the housing wherein the outer surface of the mirror support comprises a hood which has its front end coupled to the housing by pivot means and a screw jack drive has one end coupled by a first pivot pin to the hood and its other end coupled by a second pivot pin to the housing.

15. An exterior mirror for a motor vehicle comprising:

a housing adapted to be received within a recess in a vehicle body, a mirror support mounted in the housing for angular movement between a deployed position and a stowed position in which the distance by which the mirror support projects from the vehicle body is reduced, and a mirror glass mounted on the mirror support, wherein the mirror support is at least partially contained within the housing when in its stowed position and is movable between a first, partially deployed position giving a first, relatively restricted, angular field of view, and a second fully deployed position giving a greater angular field of view, the mirror support projecting further from the vehicle body when in its second deployed position than when in its first deployed position, said mirror support being mounted such that the relative angulation of said mirror glass to said vehicle body remains substantially constant during movement between said first partially deployed position and said second fully deployed position.

16. An exterior mirror for a motor vehicle comprising:

a housing adapted to be received within a recess in a vehicle body, a mirror support mounted in the housing for angular movement between a deployed position and a stowed position in which it is at least partially contained within the housing so that the distance by which said mirror support projects from the vehicle body is reduced, and a mirror glass mounted on the mirror support, wherein the mirror support comprises a mirror carrier on which the mirror glass is mounted, the mirror carrier having a cam follower engaging with a cam surface within the housing wherein the mirror support is movable between a first, partially deployed position giving a first, relatively restricted, angular field of view, and a second fully deployed position giving a greater angular field of view, the mirror support projecting further from the vehicle body when in its second deployed position than when in its first deployed position.

17. An exterior mirror for a motor vehicle comprising:

a housing adapted to be received within a recess in a vehicle body, a mirror support mounted in the housing for angular movement between a deployed position and a stowed position in which it is at least partially contained within the housing so that the distance by which said mirror support projects from the vehicle body is reduced, and a mirror glass mounted on the mirror support, wherein the mirror support comprises a mirror carrier on which the mirror glass is mounted, the mirror carrier having a cam follower engaging with a cam surface within the housing;

said housing includes a recess for receiving the mirror glass when in its stowed position, and the outer surface of the mirror support comprises a hood which has its front end coupled to the housing by pivot means so as to cover the recess when the mirror support is in its stowed position, the mirror carrier being pivotally coupled to the hood.

18. An exterior mirror according to claim 17, wherein an outer surface of the mirror support has its edge regions substantially coplanar with adjacent regions of the vehicle body when the mirror support is in its stowed position.

19. An exterior mirror for a motor vehicle comprising:

a housing adapted to be received within a recess in a vehicle body and having a pair of mutually parallel side walls, a mirror support mounted in the housing for angular movement between a deployed position and a stowed position in which it is at least partially contained within the housing so that the distance by which the mirror support projects from the vehicle body is reduced, a mirror glass mounted on the mirror support, a hood adapted to cover the recess when the mirror support is in its stowed position, and pivot means coupling the front end of the hood to the housing, said pivot means comprising a first pair of guide pegs engaging in respective first guide grooves in the side walls and a second pair of guide pegs engaging in respective second guide grooves in the side walls, the first guide pegs being at a first end of the first guide grooves and the second guide pegs being at a first end of the second guide grooves when the mirror support is in its stowed position.

20. An exterior mirror according to claim 19, wherein the mirror support is movable between a first, partially deployed position giving a first, relatively restricted, angular field of view, and a second fully deployed position giving a greater angular field of view, the mirror support projecting further from the vehicle body when in its second deployed position than when in its first deployed position.

21. An exterior mirror according to claim 19, wherein each second guide groove has a portion of arcuate shape centered on the second end of the corresponding first guide groove.

22. An exterior mirror according to claim 21, wherein said portion of arcuate shape extends to the outer edge of the corresponding side wall.

* * * * *

UNITED STATES PATENT AND TRADEMARK OFFICE
CERTIFICATE OF CORRECTION

PATENT NO.    : 6,109,755  
DATED         : August 29, 2000  
INVENTOR(S)   : Bernard Duroux & Daniel Dumont Page 1 of 1

It is certified that error appears in the above-identified patent and that said Letters Patent is hereby corrected as shown below:

<u>Title page,</u>  
Item [56] References Cited, FOREIGN PATENT DOCUMENTS, line 3, "0179350 9/1885 Japan" should be -- 0179350 9/1985 Japan --.

<u>Column 3,</u>  
Line 51, "centred" should be -- centered --.

<u>Column 4, claim 7,</u>  
Line 26, "centred" should be -- centered --.

<u>Column 4, claim 9,</u>  
Line 32, after "one" insert -- end --.

<u>Column 4, claim 11,</u>  
Line 43, after "one" insert -- end --.

Signed and Sealed this

Nineteenth Day of March, 2002

*Attest:*

JAMES E. ROGAN  
*Director of the United States Patent and Trademark Office*

*Attesting Officer*